United States Patent
Natraj et al.

(10) Patent No.: US 11,144,567 B2
(45) Date of Patent: Oct. 12, 2021

(54) DYNAMIC SCHEMA TRANSFORMATION

(71) Applicant: Schlumberger Technology Corporation, Sugar Land, TX (US)

(72) Inventors: Lucas Natraj, Katy, TX (US); Hrvoje Markovic, Mountain View, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 217 days.

(21) Appl. No.: 16/205,857

(22) Filed: Nov. 30, 2018

(65) Prior Publication Data

US 2020/0175030 A1 Jun. 4, 2020

(51) Int. Cl.
- *G06F 16/20* (2019.01)
- *G06F 16/25* (2019.01)
- *G06F 16/953* (2019.01)
- *G06F 16/21* (2019.01)

(52) U.S. Cl.
CPC .......... *G06F 16/258* (2019.01); *G06F 16/212* (2019.01); *G06F 16/953* (2019.01)

(58) Field of Classification Search
CPC ..... G06F 16/258; G06F 16/953; G06F 16/212
See application file for complete search history.

(56) References Cited

U.S. PATENT DOCUMENTS

| | | | |
|---|---|---|---|
| 7,225,411 B1 | 5/2007 | Stoner et al. | |
| 10,120,913 B1* | 11/2018 | Mullins | G06F 16/2471 |
| 2002/0069192 A1 | 6/2002 | Aegerter | |
| 2002/0180755 A1* | 12/2002 | Krueger | G06F 3/14 |
| | | | 345/601 |
| 2003/0217069 A1 | 11/2003 | Fagin et al. | |
| 2004/0034615 A1* | 2/2004 | Thomson | G06F 16/3334 |
| 2004/0093344 A1 | 5/2004 | Berger et al. | |
| 2004/0181543 A1* | 9/2004 | Wu | G06F 16/26 |
| 2005/0060647 A1* | 3/2005 | Doan | G06F 16/248 |
| | | | 715/205 |
| 2008/0021912 A1 | 1/2008 | Seligman et al. | |
| 2008/0046491 A1* | 2/2008 | Gupta | G06F 8/656 |
| | | | 708/164 |
| 2009/0106285 A1 | 4/2009 | Cheung et al. | |
| 2009/0235185 A1* | 9/2009 | Gill | G06F 16/27 |
| | | | 715/760 |
| 2011/0246415 A1* | 10/2011 | Li | G06F 16/254 |
| | | | 707/602 |
| 2015/0012553 A1 | 1/2015 | Hazelwood et al. | |
| 2016/0092527 A1 | 3/2016 | Kang et al. | |

(Continued)

OTHER PUBLICATIONS

International Search Report and Written Opinion for the counterpart International patent appliction PCT/US2019/063265 dated Mar. 20, 2020.

(Continued)

*Primary Examiner* — Tarek Chbouki
(74) *Attorney, Agent, or Firm* — Colin L. Wier

(57) ABSTRACT

Dynamic schema transformation that involves a target schema that is determined from a request. A set of transformations is identified between a set of source schemas and the target schema. A set of source entities that correspond to the set of source schemas is received. The set of source entities is converted to a set of target entities by applying the sets of transformations to the set of source entities. A reply is presented that comprises target data from the set of target entities.

20 Claims, 12 Drawing Sheets

(56) References Cited

U.S. PATENT DOCUMENTS

2017/0031958 A1 2/2017 Miller
2018/0246912 A1* 8/2018 Arning .................. G06F 16/215

OTHER PUBLICATIONS

International Preliminary Report on Patentability for the counterpart International patent appliction PCT/US2019/063265 dated Jun. 10, 2021.

* cited by examiner

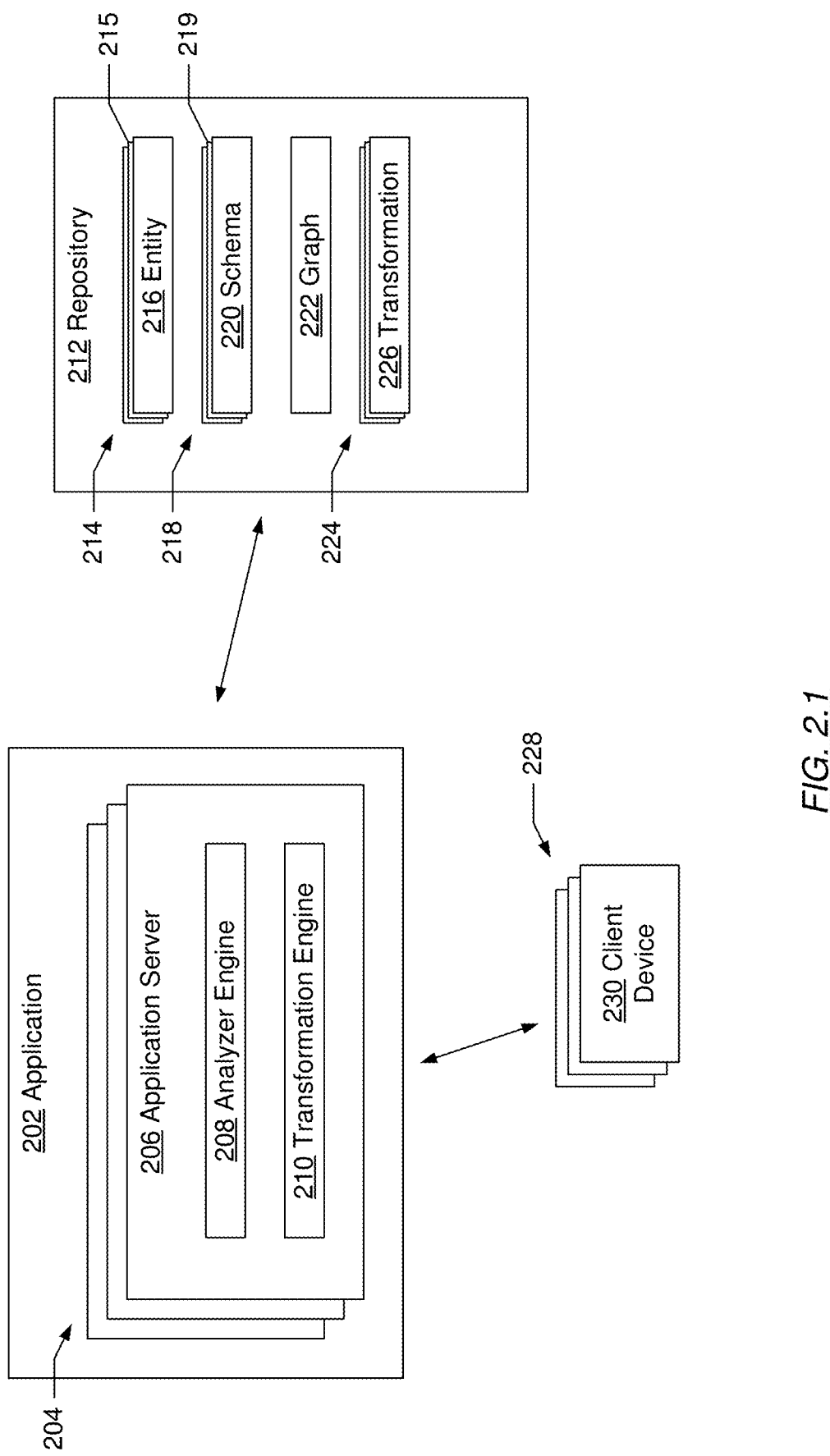
FIG. 2.1

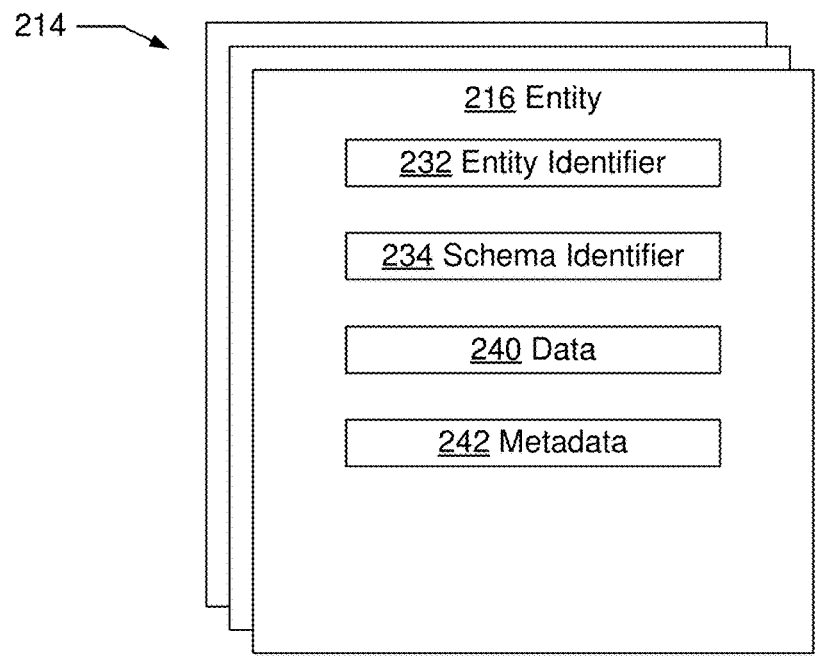
FIG. 2.2
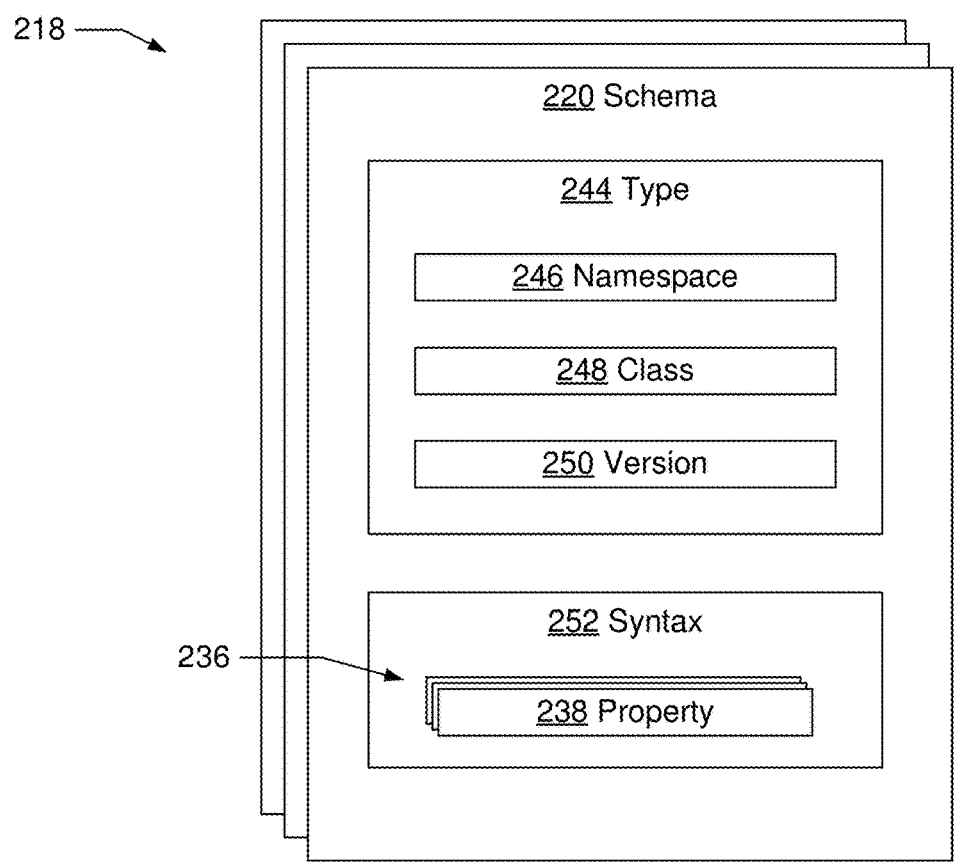
FIG. 2.3

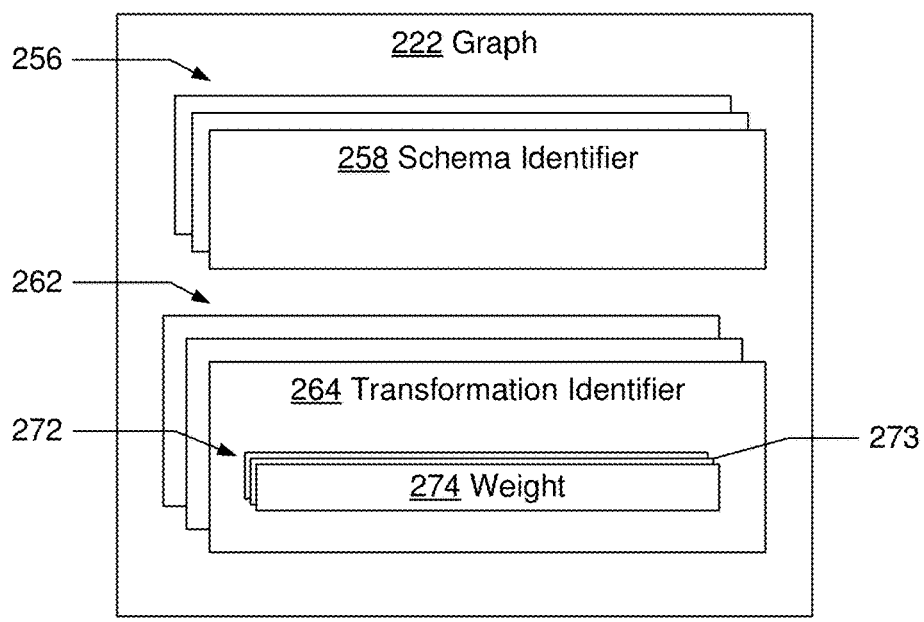
FIG. 2.4
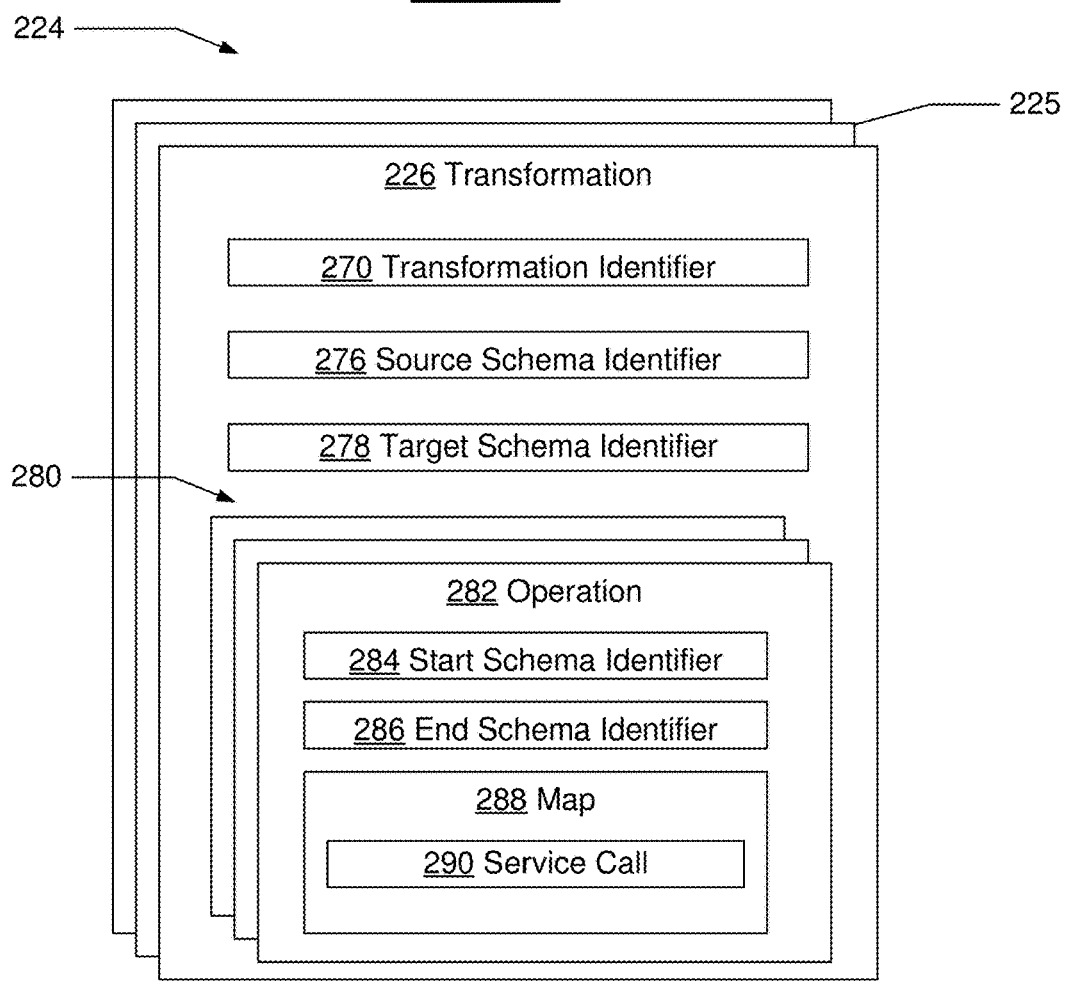
FIG. 2.5

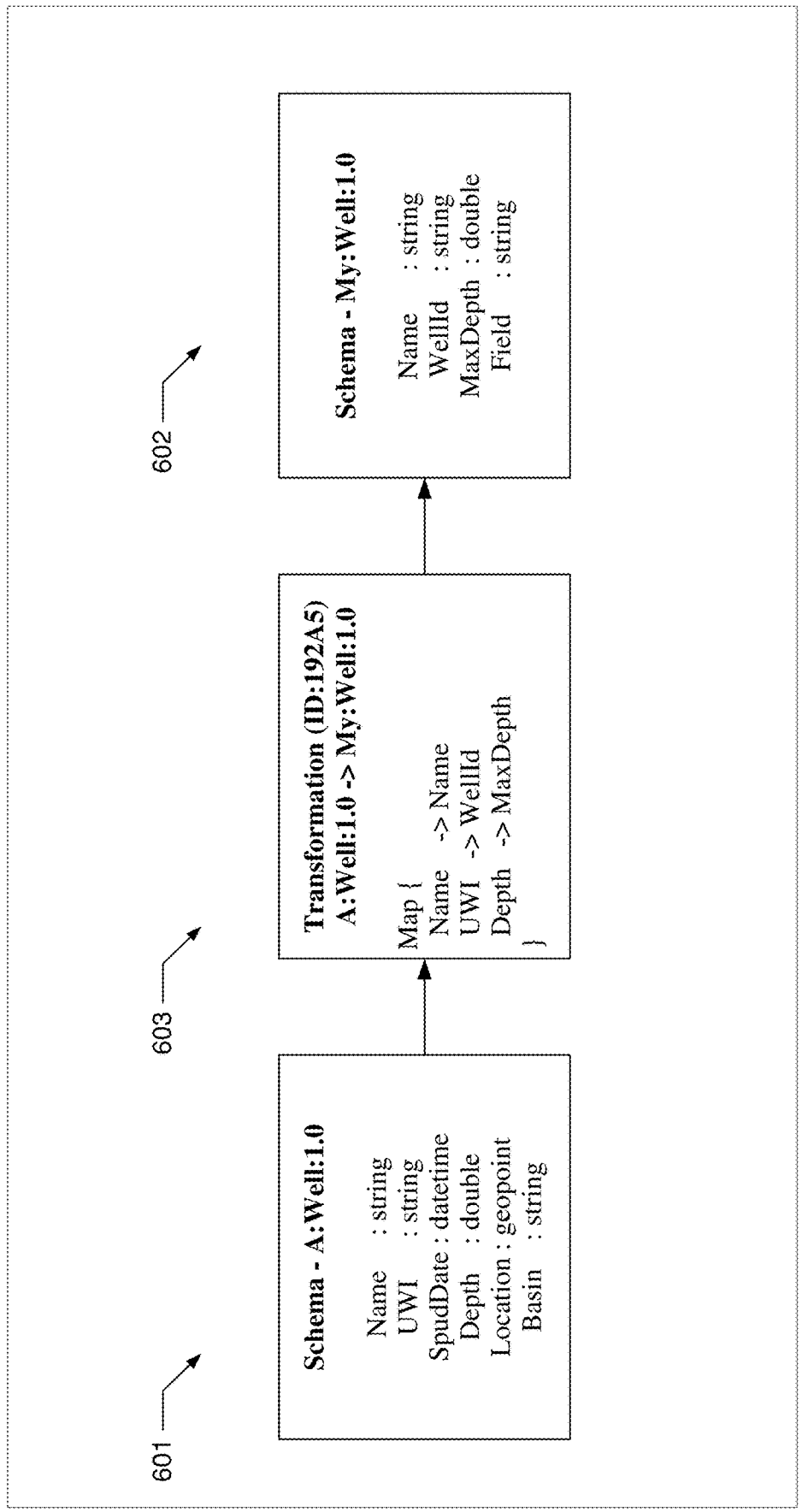
FIG. 6.1

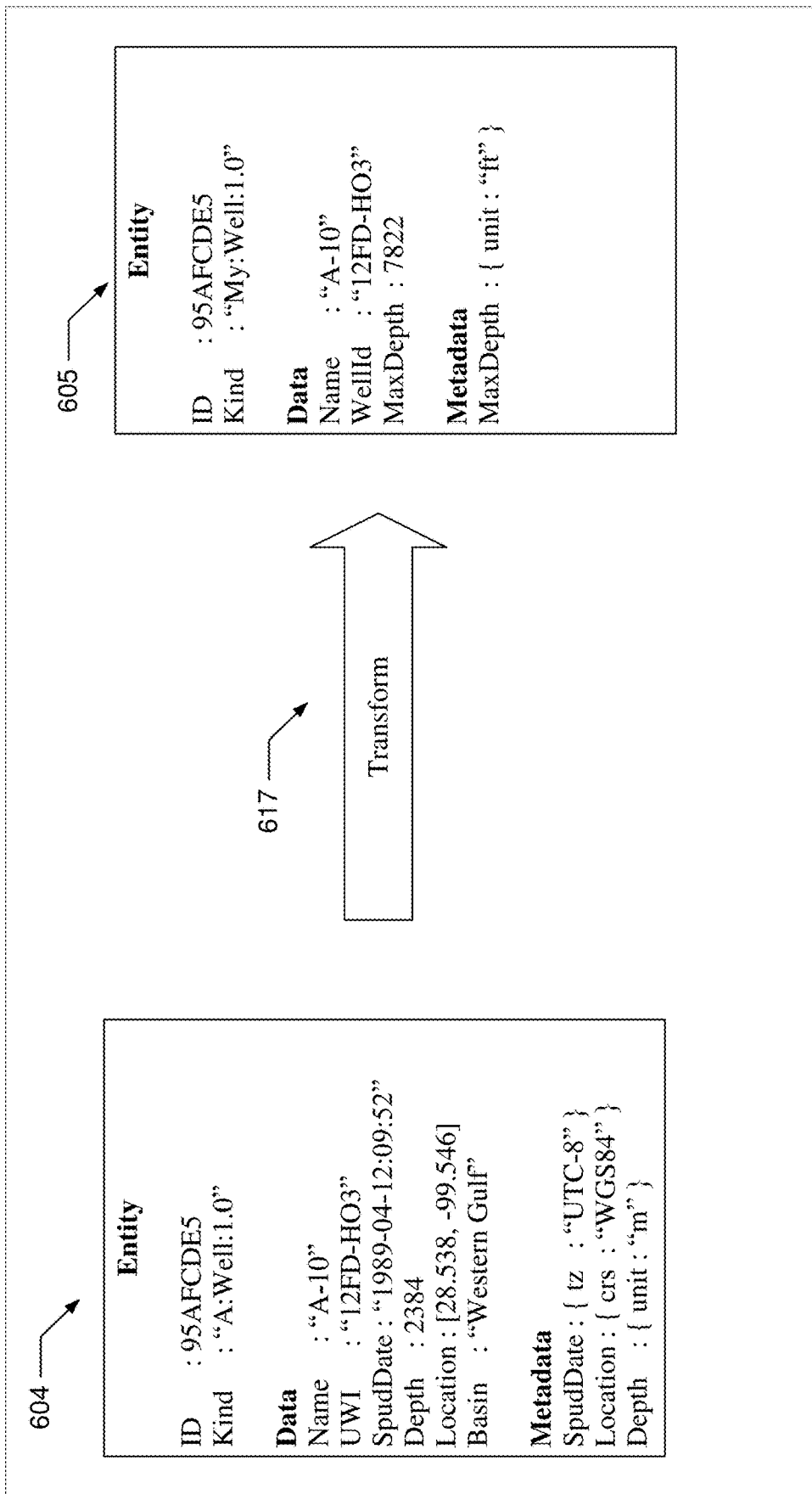
FIG. 6.2

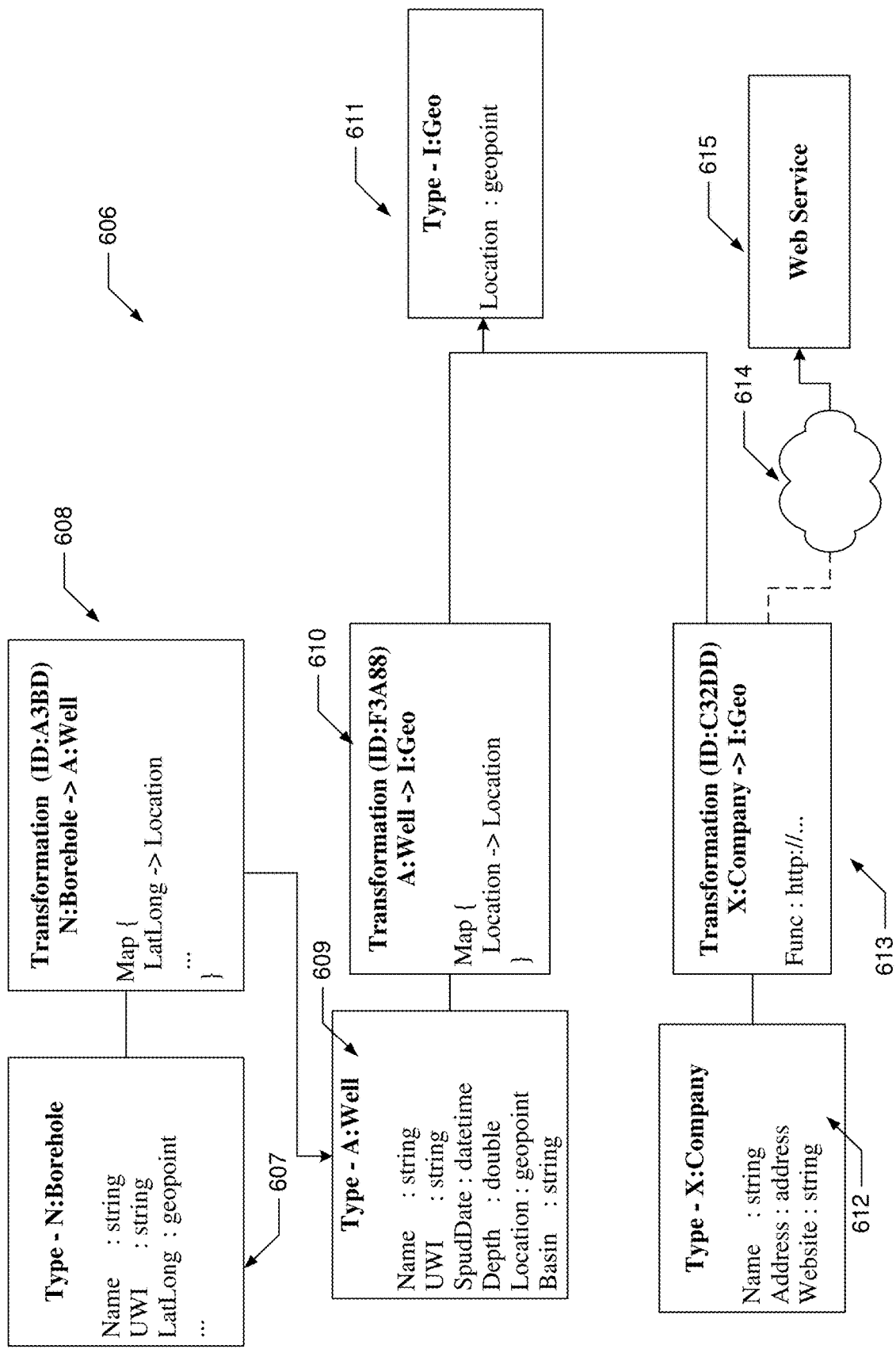
FIG. 6.3

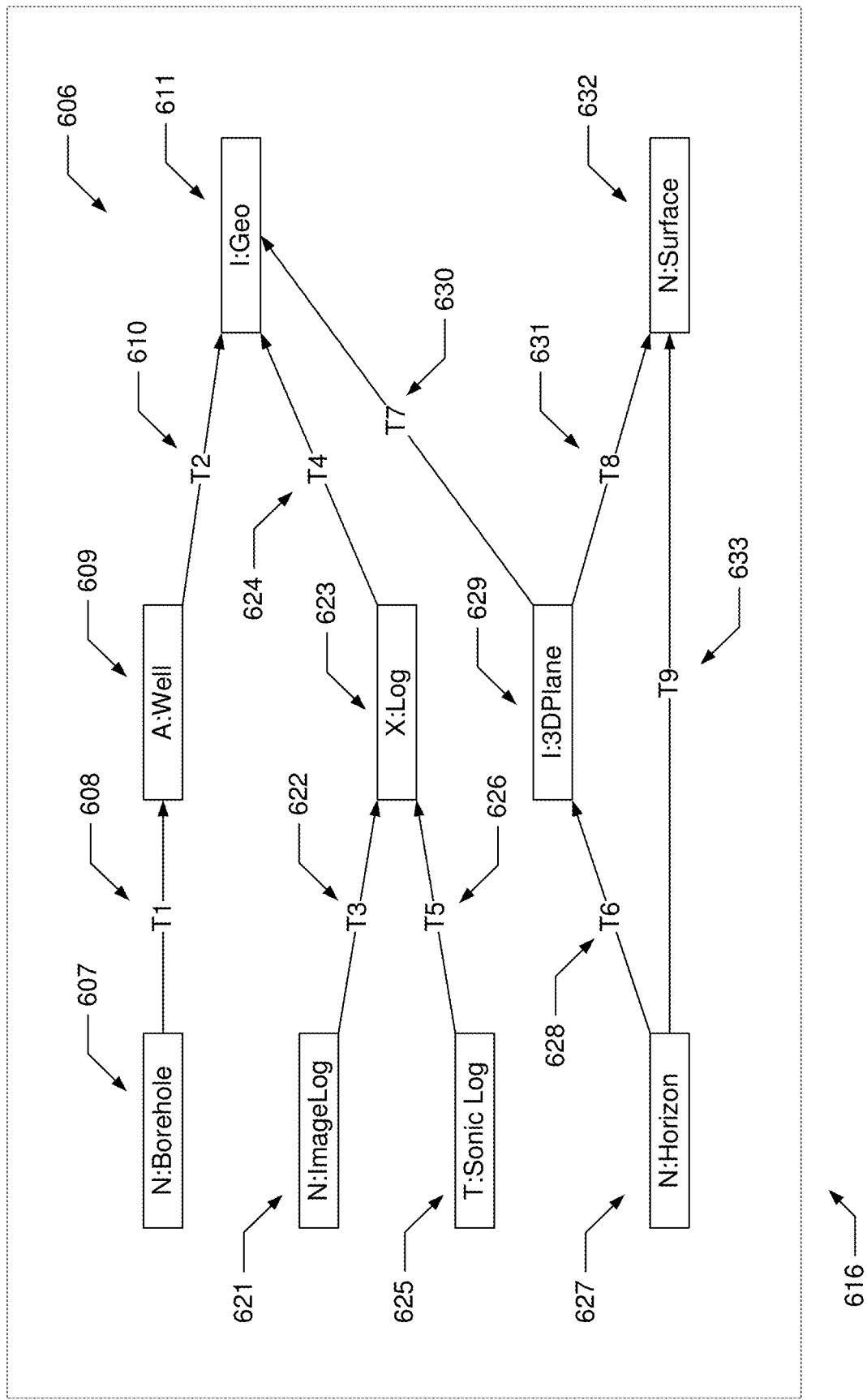
FIG. 6.4

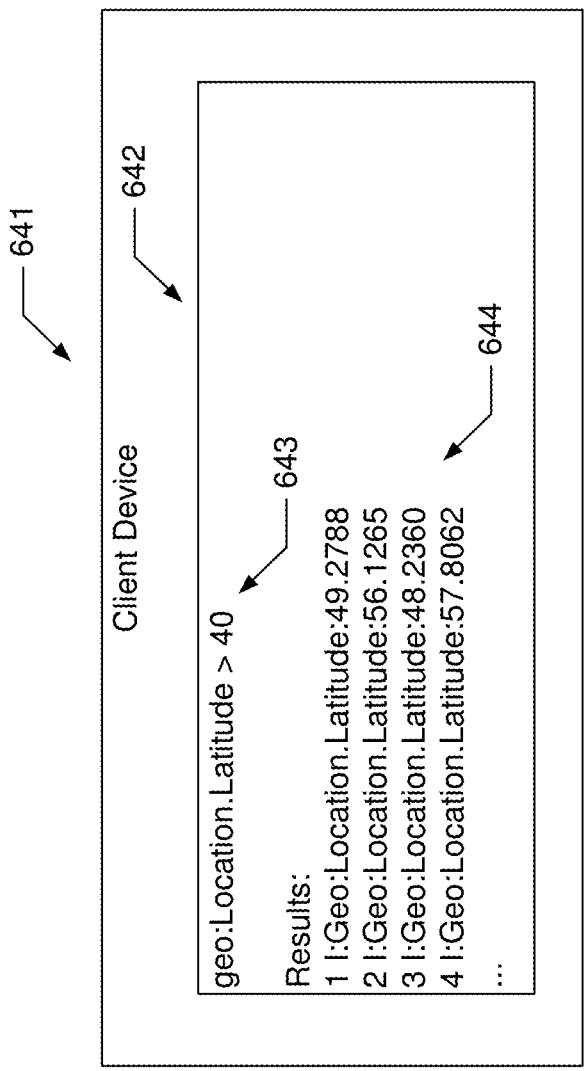
FIG. 6.5

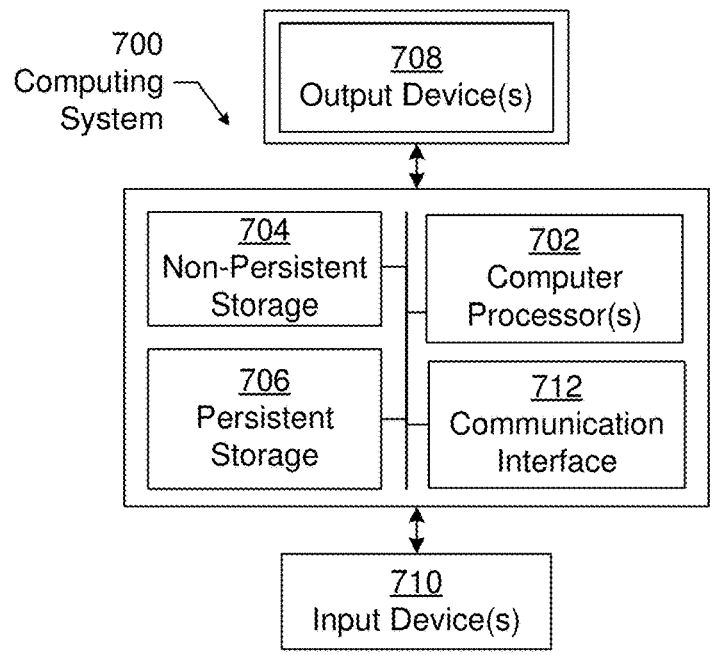
*FIG. 7.1*
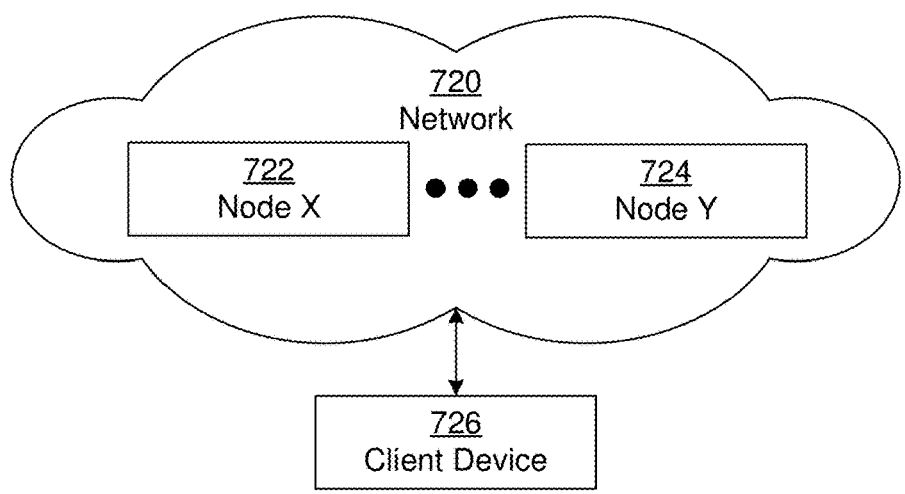
*FIG. 7.2*

DYNAMIC SCHEMA TRANSFORMATION

BACKGROUND

There are several stages within the lifespan of the Exploration & Production (E&P) process for acquiring subsurface minerals. The several stages may span several years and involve several companies, people, and software. The various companies, people, and software may use different terminology for the same concepts, such as 'wells', 'logs', 'faults', 'horizons', etc. The multiple ways of describing the semantically similar terminology introduces a significant problem when data from disparate sources are ingested into a common data storage or space. Specifically, queries and calculations may be incomplete when data is discarded because the data did not match the expected format or schema. A challenge exists in acquiring data from multiple data sources that use multiple schemas.

SUMMARY

In general, in one or more aspects, the disclosure relates to dynamic schema transformation. A target schema is determined from a request. A set of transformations is identified between a set of source schemas and the target schema. A set of source entities that correspond to the set of source schemas is received. The set of source entities is converted to a set of target entities by applying the sets of transformations to the set of source entities. A reply is presented that comprises target data from the set of target entities.

Other aspects of the disclosure will be apparent from the following description and the appended claims.

BRIEF DESCRIPTION OF DRAWINGS

FIGS. 2.1, 2.2, 2.3, 2.4, and 2.5 show diagrams of a system in accordance with disclosed embodiments.

FIGS. 6.1, 6.2, 6.3, 6.4, and 6.5 show an example in accordance with disclosed embodiments.

FIGS. 7.1 and 7.2 show computing systems in accordance with disclosed embodiments.

DETAILED DESCRIPTION

Figure 1:
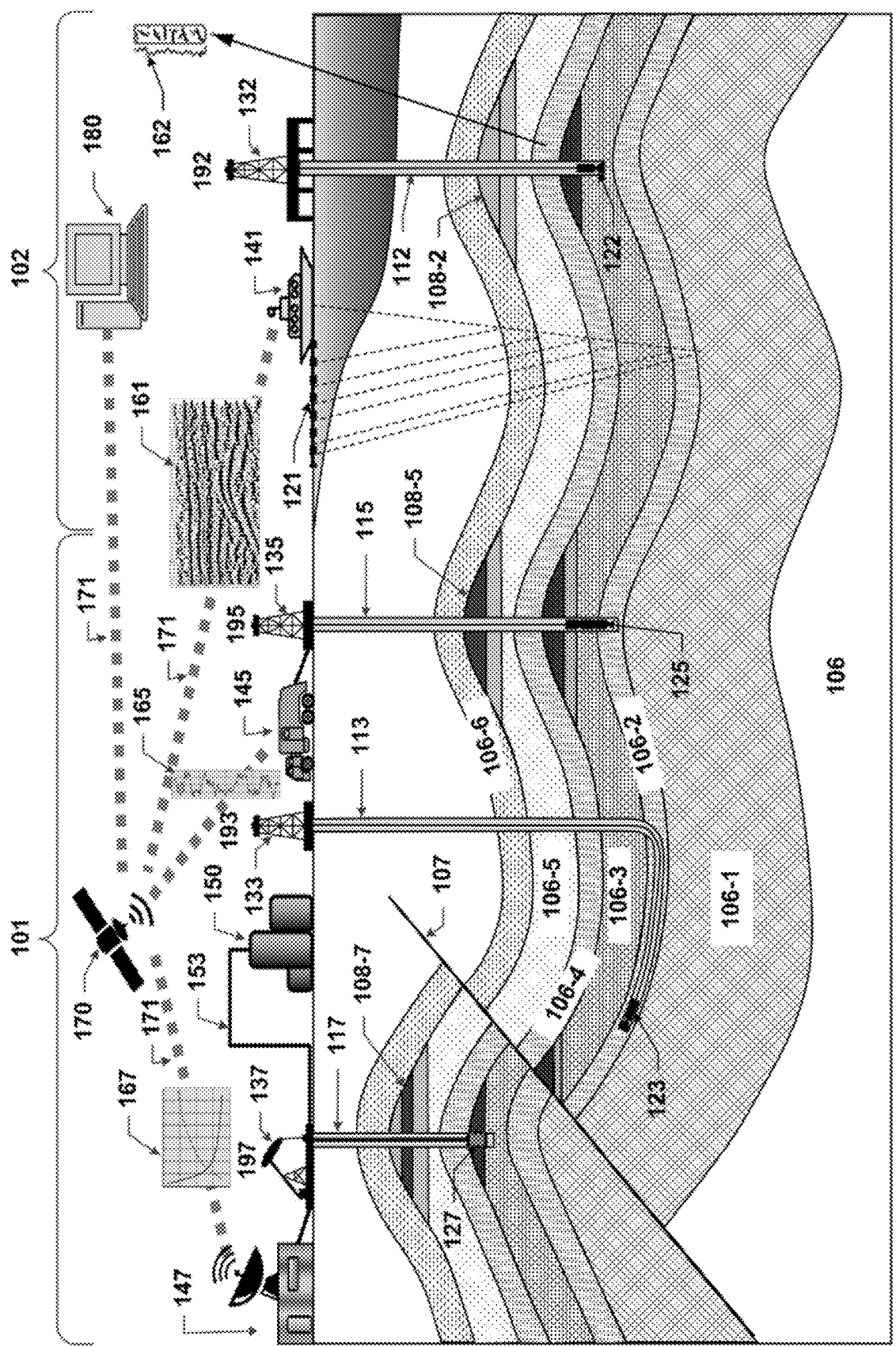
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to analyzing data using dynamic schema transformation. The system maintains data in entities that are defined according to multiple different schemas. Transformations are defined between different schemas that allow for converting entities stored according to one schema to be processed according to another schema. After converting the entities to a common schema, the data can be filtered, searched, and processed.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time.

Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 7.1 and 7.2 and described below.

FIGS. 2.1 through 2.5 show diagrams of one or more embodiments that are in accordance with the disclosure. The various elements, systems, and components shown in FIGS. 2.1 through 2.5 may be omitted, repeated, combined, and/or altered as shown from FIGS. 2.1 through 2.5. Accordingly, the scope of the present disclosure should not be considered limited to the specific arrangements shown in FIGS. 2.1 through 2.5.

Referring to FIG. 2.1, the application (202) is in communication with the client devices (228) and the repository (212). The client devices (228) interact with the application (202), which interacts with the repository (212).

The application (202) is a set of programs that process requests from the client devices (228). In one or more embodiments, the application (202) is a web service that is available to the client devices (228) over the interne or private networks and uses standardized messaging systems and protocols for receiving and transmitting requests. In one or more embodiments, extensible markup language (XML) is used with the simple object access protocol (SOAP) and representational state transfer application programming interfaces (RESTful APIs). In one or more embodiments, JavaScript object notation (JSON) is used to format messages and requests. In one or more embodiments, the application (202) is a web service that provides searchable access to the data stored in the entities (214) of the repository (212). In one or more embodiments, the application (202) is a distributed application that executes on the application servers (204).

The application servers (204) include the application server (206), which is a virtual machine instance that executes one or more of the programs that make up the application (202). The application server (206) operates on a physical computing device with processors and memory, such as the computing system (600) and nodes (722, 724) described in FIGS. 7.1 and 7.2. As another example, the application server may be dedicated hardware and software for executing an application. For example, an application server may be a physical machine. By way of another example, the application server may be any computing system, such as a user's local computing system. The application server (206) hosts programs that include the analyzer engine (208) and the transformation engine (210).

The analyzer engine (208) is a program executing on the application server (206). The analyzer engine (208) analyzes the data stored in the repository (212). In one or more embodiments, the analyzer engine (208) analyzes data (240) and metadata (242) in of the entities (214) and presents results to the client devices (228).

The transformation engine (210) is a program running on the application server (206). The transformation engine (210) executes the transformations (224) that convert the entities (214) between the different schemas (218), which is described further below.

The repository (212) is any type of storage unit and/or device (e.g., a file system, database, collection of tables, or any other storage mechanism) for storing data. Further, the repository (212) may include multiple different storage units and/or devices. The multiple different storage units and/or devices may or may not be of the same type or located at the same physical site. The repository (212) stores the entities (214), the schemas (218), the graph (222), the transformations (224), which are described below in FIGS. 2.2 through 2.5. In one or more embodiments, the repository includes multiple graphs.

The client devices (228) include the client device (230), which is an embodiment of the computer system (180) of FIG. 1 and the computing system (600) of the FIG. 6.1. The client devices (228) communicate with the application (202) to engage and operate the analyzer engine (208) and display analyzed information from the entities (214). The client devices (228) can display data from the repository (212), including the entities (214), the schemas (218), the graph (222), the transformations (226), etc. The client devices (228) can display the progress of the analyzer engine (208) and the transformation engine (210).

Referring to FIG. 2.2, the entities (214) include the entity (216), which includes the entity identifier (232), the schema identifier (234), the data (240), and the metadata (242). The entities (214) are collections of data stored in the repository (212). In one or more embodiments, the entity (216) stores exploration and production data in the data (240), and the metadata (242). In one or more embodiments, an entity is a specific unit of data that may be the target of a search and can include multiple named values. For example, an entity can include one or more pressure values along the length of a particular well. By way of another example, an entity may be the porosity at a specific subsurface location. By way of another example, the entity may be a reservoir model.

The entity identifier (232) identifies the entity (216). The entity identifier (232) can include a sequence of numbers and characters that is unique to the entity (216). In one or more embodiments, the entity is explicitly or implicitly related to the entity identifier. For example, the entity identifier may be defined based on position of the entity within the set of entities. By way of another example, the entity identifier may be an alphanumeric value that is a link in the repository to the entity.

The schema identifier (234) identifies a schema for the entity (216). In one or more embodiments, the schema identifier (234) identifies the schema (220) as the schema that defines the entity (216).

The data (240) is the values of the entity (216) and the metadata (242) describes the values in the data (240), such as by providing the units of measure. For example, when the data (240) includes a value for the depth of a well measured in feet, the depth is stored in the data (240) as a floating point number and the units of measure (meters/feet) can be stored in the metadata (242) as a string. In one or more embodiments, the data (240) is structured according to the properties (236) defined by the syntax (252) of the schema (220). In one or more embodiments, the metadata (242) is also defined in the syntax (252) of the schema (220) and uses a name value pair where the name identifies the property (238) defined in the schema (220) and the value is associated with the property (238).

Referring to FIG. 2.3, the schemas (218) define how the data in the entities (214) is stored. The schemas (218) include the schema (220). Each schema defines, for one or more entities, how the one or more entities are stored. For example, each individual schema may be for a corresponding individual repository of entities. The schema (220) includes the type (244) and the syntax (252). The type (244) of the schema (220) uniquely identifies the schema (220) within the schemas (218). In one or more embodiments, the type (244) is a string that includes the namespace (246), the class (248), and the version (250). The type (244) can be used as a schema identifier. In one or more embodiments, the schema identifier (234) of the entity (216) of FIG. 2.2 is a string that includes the namespace (246), the class (248), and the version (250). For example, the type "A:Well:1.0" can be used as a schema identifier that identifies a schema having the namespace "A", the class "Well", and the version "1.0". In one or more embodiments, the syntax (252) is the set of rules that defines the combinations of symbols, values, names, strings, numbers, etc. required for correctly structuring an entity as defined by the schema (220) and identified with the type (244). The syntax includes the properties (236).

The properties (236) include the property (238). In one or more embodiments, the properties (236) define the property names and data types for the data (240) and the metadata (242). A property includes a property name and a data type. The property name is an identifier of data within an entity. The property name, for example, may be porosity, horizontal stress, permeability, valve position, etc. The data type identifies the type of data structure used to store the value for the property. By way of example, the property (238) can be a depth property with a property name of "Depth" and data type that indicates that the value is stored as a floating point number (e.g., 2384.0).

Referring to FIG. 2.4, the graph (222) relates schemas and transformations. Specifically, each node in the graph corresponds to a unique schema. The node has the schema identifier (256) that corresponds to the node. Each edge in the graph corresponds to a transformation between two schemas. Thus, the edges have corresponding transformation identifiers (262). An edge connects two nodes (e.g., first node, second node) when a transformation corresponding to the edge exists that transforms an entity matching a schema represented by a first node to an entity having the schema represented by the second node. In one or more embodiments, the graph (222) is a directed graph in that each edge is directional. As shown, the graph (222) includes the schema identifiers (256) and the transformation identifiers (262). The graph (222) identifies the transformations (224) that can be made between the entities (214).

The schema identifiers (256) identify the schemas that form the nodes of the graph (222). The schema identifiers (256) include the schema identifier (258). In one or more embodiments, the schema identifier (258) identifies the schema (220).

The transformation identifiers (262) form the edges and connections between the schemas that represent the nodes of the graph (222). The transformation identifiers (262) include the transformation identifier (264), which includes the weights (272).

In one or more embodiments, the graph (222) is a weighted graph having weights related to each edge. The weights (272) define a cost for converting source entities to target entities that are defined by source schemas and target schemas in transformations and can be used to determine which transformations to use. The weights (272) include the weight (273) and the weight (274). In one or more embodiments, the weight (273) is a function of the amount of time to execute the transformation (225) on a source entity and generate a target entity. In one or more embodiments, the weight (274) may be a function of the number of operations (282) required to perform the transformation (226). Thus, the transformation corresponding to an edge having the greater weight may be less desirable than the transformation (s) having less weight.

Referring to FIG. 2.5, the transformations (224) define how to convert entities between different schemas (218). The transformations (224) include the transformation (226). The transformations (224) can be direct or indirect. Direct transformations convert a start entity (valid under a start schema) directly to an end entity (valid under an end schema) without intermediate transformations to intermediate entities (valid under intermediate schemas). Indirect transformations include the use of intermediate transformations to convert start entities to end entities. The transformation (226) includes the transformation identifier (270), the start schema identifier (276), the end schema identifier (278), and the operations (280). A set of one or more transformations from a start schema to an end schema corresponds to a path in the graph (222) from a node matching the start schema through one or more intermediate nodes via edges to a node matching the end schema. Each edge along the path corresponds to an individual transformation in the set of transformations.

The transformation identifier (270) identifies the transformation (226). In one or more embodiments, the transformation identifier (270) is a string of alphanumeric characters that is unique to the transformation (226) and identifies the transformation (226) within the set of transformations (272).

The source schema identifier (276) identifies one of the schemas (218) as being the schema that defines the source entity being converted by the transformation (226). The target schema identifier (278) identifies one of the schemas (218) as being the schema that defines the target entity that results from the transformation (226).

The operations (280) convert source entities that are valid under source schemas directly to target entities that are valid under target schemas without intermediate conversions. For example, the transformation (226) can include two operations where the first operation converts a start entity to an intermediate entity and the second operation converts the intermediate entity to an end entity. The operations (280) include the operation (282).

The operation (282) includes the start schema identifier (284), the end schema identifier (286), the map (288). The start schema identifier (284) that identifies a start schema under which a start entity is valid. The end schema identifier (286) that identifies an end schema under which an end entity will be valid after execution of the operation (282).

The map (288) specifies the properties that are converted with the operation (282). In one or more embodiments, the map (288) identifies a start property defined in the start schema and links the start property to an end property defined in the end schema. In one or more embodiments, the values related to the start property of a start entity are converted to the end property of the end entity. In one or more embodiments, the map (288) can also include additional instructions to facilitate converting a start entity to an end entity. In one or more embodiments, map (288) includes the service call (290).

The service call (290) specifies a function that can perform a conversion required by the operation (282). In one or more embodiments, the service call (290) is a call to a web service that takes start entity property values as inputs and returns data for the end entity property. For example, consider the scenario in which the start entity property is for a street address and the datatype of the start entity property is a set of strings. In the example, the input to the service call is a set of strings that specify a particular street address defined in the start entity property. Continuing with the example, the web service of the service call converts street address to geographic coordinates (longitude, latitude, elevation, etc.). The geographic coordinates are loaded into the end entity property. In other words, in the example, the service call is used convert a street address to the geographic coordinates.

In general, one or more embodiments receive a request that identifies a target schema. The target schema defines the target properties of data that the user or requesting system may want to receive. The request does not identify data repositories, particular entities, or specific sources of the data in accordance with one or more embodiments. Using the graph, one or more embodiments determine the one or more source schemas in which at least one path exists to the target schema. In other words, based on the graphs, the paths to the target schema are determined. From the source schemas, the entities having a schema identifier matching one or more of the source schemas are identified. Thus, the entities and data sources which are not known prior to determining the paths to the target may be determined. The series of transformations, defined by the respective paths, are performed on the entities to obtain corresponding transformed entities in the target schema. The corresponding transformed entities may then be returned in response to the original request.

Figure 3:
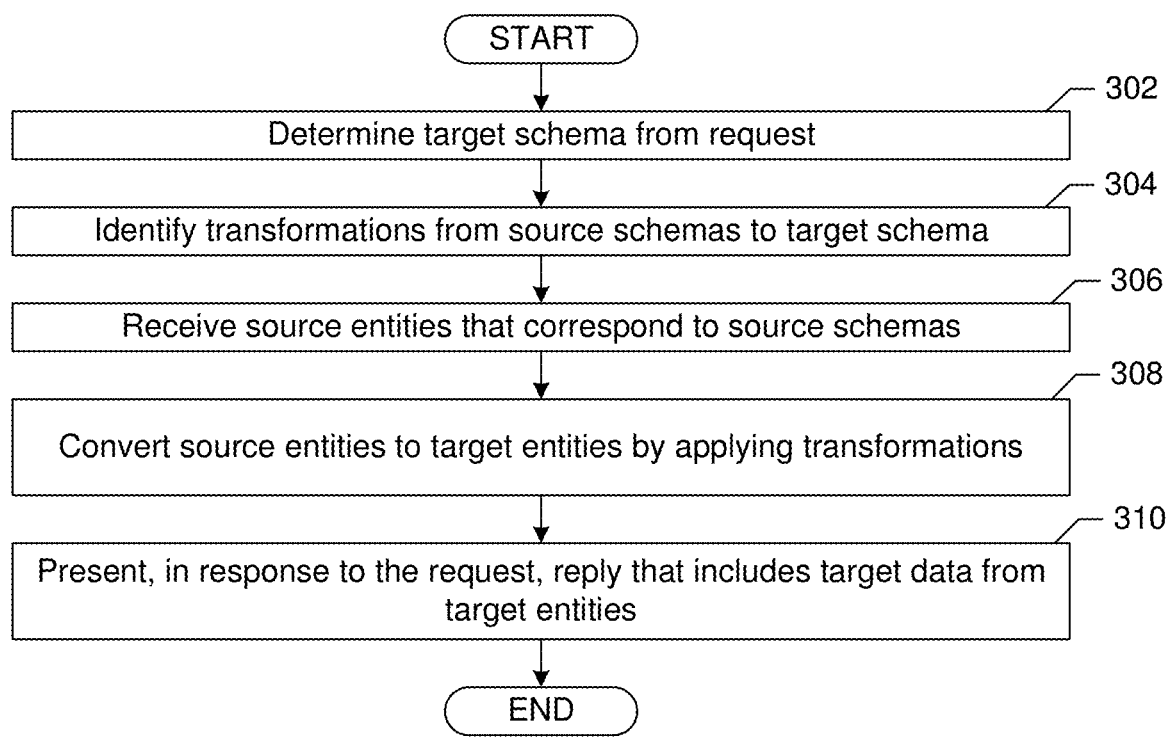
FIGS. 3, 4, and 5, show flowcharts in accordance with disclosed embodiments.
Figure 4:
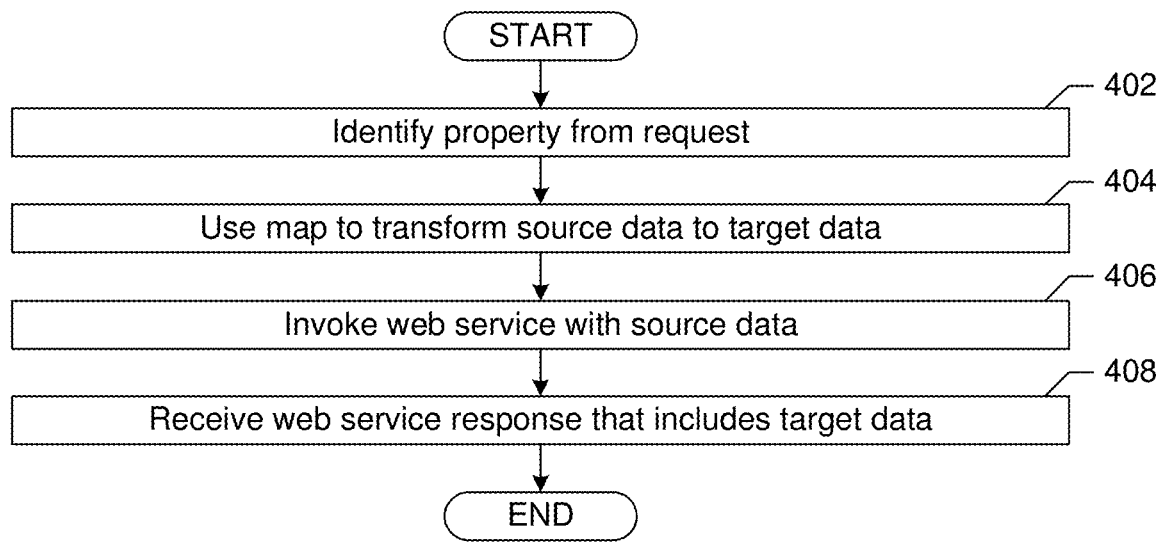
Figure 5:
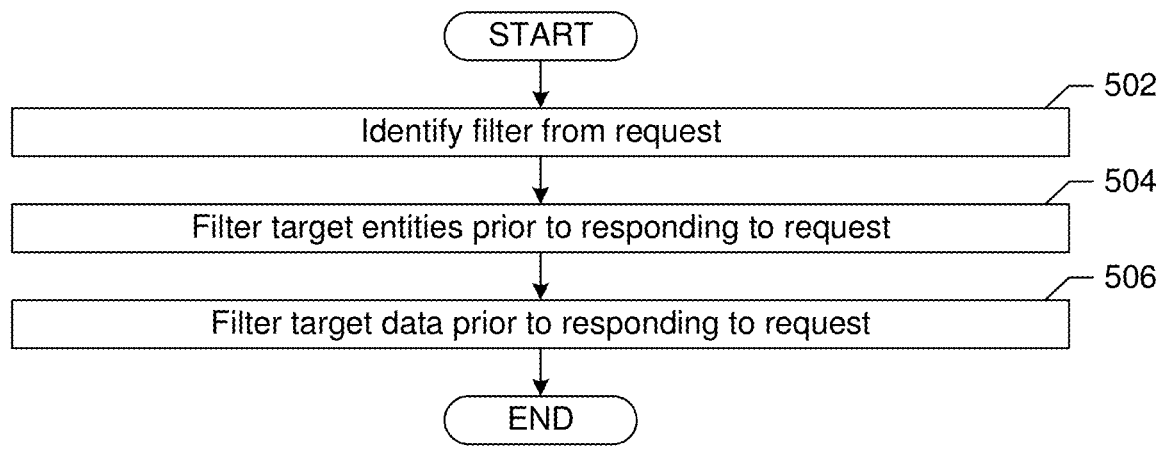

FIG. 3, FIG. 4, and FIG. 5 show flowcharts in accordance with one or more embodiments of the disclosure. While the various blocks in these flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

Turning to FIG. 3, FIG. 3 shows a flowchart in accordance with one or more embodiments of the disclosure. In Block 302, a target schema is determined from a request. In one or more embodiments, the request identifies the target schema from which a set of target entities can be identified and retrieved but does not identify the source schemas and source entities, which are derived later. In one or more embodiments, the request can be part of a search query and identify one or more of the target schemas, the type of the target schema, the namespace of the target schema, the class of the target schema, the version of the target schema, and a property defined by the syntax of the target schema. In one or more embodiments, incomplete information can be filled in using contextual information or default values. For example, with the query:

geo:Location.Latitude>40 the target schema is identified from "geo:Location.Latitude", which identifies a class "geo" and a property "Location.Latitude", but does not identify the namespace or the version of the target schema. The namespace "l" can be determined from the context (e.g., a previous or query that identified the namespace) or a default namespace can be used. The version "1.10" can default to the latest version of the schema. The query above also includes a filter, which is discussed below in FIG. 5.

In Block 304, transformations are identified that can convert between source schemas and the target schema. In one or more embodiments, after determining the target schema a set of transformations is identified from a list of available transformations. The set of transformations include transformations that have target schema identifiers that match the target schema that was previously determined. From the set of transformations, a set of source schemas is identified from the source schema identifiers within the transformations.

In one or more embodiments, the transformations are determined from the graph. Specifically, a source node corresponding to the source schema is identified. The target node corresponding to the target schema is identified. Paths from the source node to the target node are determined through analyzing the graph. If multiple paths exist, the path having optimal set of weights may be selected. For example, the path having the least total weight may be selected.

In Block 306, source entities are received that correspond to the source schemas. After identifying the set of source schemas, the system identifies a set of source entities that are defined according to at least one of the source schemas. As an example, the analyzer engine can send the source schema identifiers to databases that respond by providing entities that are compatible with the source schemas identified with the source schema identifiers.

In Block 308, source entities are converted to target entities by applying transformations. In one or more embodiments, the analyzer engine applies the set of transformations identified from the available transformations to the source entities that were received. In one or more embodiments, individual transformations can include multiple operations that convert a source entity through a sequence of one or more intermediate entities before generating the target entity. A process for converting entities is further described in FIG. 4. In one or more embodiments, when multiple paths are available for converting from a source schema to a target schema, the weights associated with the transformations in the paths are used to determine the path (having the least cumulative weight) to use for performing the transformation.

In one or more embodiments, entities that are transformed are stored in a cache to expedite repeated executions by reducing the number of transformations needing to be performed, which is useful when a transformation involves a remote service invocation. In one or more embodiments, transformations are versioned with a version number that increases when updated to enable cashing and reuse of previously transform entities in subsequent queries that use the same transformations. In one or more embodiments, a given transformation is re-executed on an entity when a cached entity is not available or when a newer version of the transformation is available.

In Block 310, a reply is presented in response to the request that includes target data from the target entities. In one or more embodiments, the target data in the target entities was converted from the source data in the source entities by the analyzer engine. In one or more embodiments, the application presents the target data by transferring the target data using extensible markup language (XML) to the client device. The client device displays the target data using hypertext markup language (HTML) with a web browser on the client device in response to the request that was initially sent from the client device and received by the application.

Turning to FIG. 4, FIG. 4 shows a flowchart for converting source data to target data in accordance with one or more embodiments of the disclosure. In Block 402, a property is identified from a request. In one or more embodiments, a property is a target property of a target entity for which data is being requested. For example, with the query:

geo:Location.Latitude>40 the property "Location.Latitude" is identified as the target property.

In Block 404, a map is used to transform source data to target data. In one or more embodiments, the analyzer engine uses a map from an operation of a transformation to transform the source data to the target data. The map is used to copy data and metadata from the source entity to the target entity. In one or more embodiments, the maps include instructions to adjust the data being copied from the source entities to the target entities. For example, a map can include instructions to convert between units (e.g., feet to meters), types (e.g., float to string), and presentation (e.g., fixed point display to floating point display).

In Block 406, a web service is invoked with the source data. In one or more embodiments, the analyzer engine transforms the source data to the target data by using a web service. For example, a source entity property can include the street address:

500 Fifth Avenue

New York, N.Y.

which is reconstructed into a web service call:

https://webservice.tld/search?q=500+Fifth+Avenue+New+York+NY that is passed to the web service by the analyzer engine.

In Block 408, a response is received from the web service that includes the target data. In one or more embodiments, the analyzer engine receives the target data from the web service in a JavaScript object notation (JSON) formatted string. For example, a response to the web service call from above may include the JSON formatted string:

{"Latitude":"40.7539143","Longitude":"−73.9810162"} from which the target data that includes the latitude and longitude can be incorporated into the target property of the target entity.

Turning to FIG. 5, FIG. 5 shows a flowchart for filtering data in accordance with one or more embodiments of the disclosure. In Block 502, a filter is identified from a request. The filter can specify a type of data, a range of values, a minimum value, maximum value, specific values, etc. For example, the query:

geo:Location.Latitude>40 includes a filter "Location.Latitude>40", which specifies that only entities with the latitudes property that is greater than 40 degrees should be presented.

In Block 504, the target entities are filtered prior to responding to the request. In one or more embodiments, the analyzer engine filters the target entities based on the property identified in the filter. For example, with the filter "Location.Latitude>40", which specifies the "Location.Latitude" property, the target entities that do not have the property specified by the filter are removed from the results.

In Block 506, target data is filtered prior to responding to the request. In one or more embodiments, the analyzer engine filters the target data based on the filter. For example, with the filter "Location.Latitude>40", which specifies that the property value must be greater than 40, the target entities with target data that do not have the value specified by the filter are removed from the results.

FIGS. 6.1 through 6.5 show diagrams of one or more embodiments that are in accordance with the disclosure. The various elements, features, systems, components, and interfaces shown in FIGS. 6.1 through 6.5 may be omitted, repeated, combined, and/or altered as shown from FIGS. 6.1 through 6.5. Accordingly, the scope of the present disclosure should not be considered limited to the specific arrangements shown in FIGS. 6.1 through 6.5.

Referring to FIG. 6.1, the user interface (616) can be used to display and edit the schemas (601, 602) and the transformation (603). In one or more embodiments, the user interface (616) is displayed on a client device to edit one or more graphs, transformations, schemas, and entities from the repository. Definitions are provided for the source schema (601), the target schema (602), and the transformation (603). The transformation (603) can be used to transform an entity defined in accordance with the source schema (601) to an entity that accords with the target schema (602).

The source schema (601) is the type "A:Well:1.0", which includes the namespace "A", the class "Well", and the version "1.0". Six properties are defined as part of the syntax of the source schema (601). The "Name", "UWI", and "Basin" properties store the name of the well, a universal well identifier (UWI), and the name of the basin where the well is located. The "Name", "UWI", and "Basin" properties are stored as strings. The SpudDate property is stored as a "datetime" object and indicates when the main drill bit began drilling into the ground. The "Depth" property is stored as a 64 bit double precision floating point number ("double") and indicates the maximum depth of the well. The "Location" property is stored as a "geopoint" object that includes floating point values for latitude and longitude.

The target schema (602) is the type "My:Well:1.0", which includes the namespace "My" that is different from the namespace of the source schema (601). Four properties are defined as part of the syntax of the target schema (602). The "Name", "WellId", and "field" properties store the name of the well, a well identifier, and the name of the field where the well is located. The "Name", "WellID", and "Field" properties are stored as strings. The "MaxDepth" property is stored as a 64 bit double precision floating point number ("double") and identifies the maximum depth to which the well has been drilled.

The transformation (603) includes a transformation identifier "192A5" to distinguish the transformation (603) from other transformations in the system. The transformation (603) includes a single operation to convert an entity directly from the source schema (601) to the target schema (602). The string "A:Well:1.0→My:Well:1.0" includes a source schema identifier "A:Well:1.0" for the source schema (601) and a target schema identifier "My:Well:1.0" for the target schema (602). The transformation (603) includes a map that identifies three properties from the source schema (601) ("Name", "UWI", "Depth") that can be converted to properties of the target schema (602) ("Name", "WellId", "MaxDepth").

Referring to FIG. 6.2, the user interface (616) is updated to display and edit the entities (604, 605). The source entity (604) and the target entity (605) are shown with the transformation button (617). Selecting the transformation button 617 transforms the source data from the source entity 604 to the target data in the target entity 605 using the transformation (603) from FIG. 6.1.

The source entity (604) includes an entity identifier ("95AFCDE5") and a schema identifier ("A:Well:1.0") with data and metadata. The data includes values for the properties defined in the source schema (601). The metadata includes metadata values for three of the properties ("SpudDate", "Location", and "Depth"). Resource entity (604) includes the property named "Depth" with a value of (2384), which is measured in meters.

The target entity (605) includes the same entity identifier ("95AFCDE5") and a different schema identifier ("My:Well:1.0") as compared to the source entity (604). The target entity (605) includes data converted from the source entity (604). The data includes values for the properties "Name", "WellId", and "MaxDepth". The metadata includes metadata a value for one property ("MaxDepth"). The values for the "Name" and "WellId" properties are copied from the source entity (604). The value for the "MaxDepth" property is converted from 2384 meters in the source entity (604) to 7822 feet in the target entity (605).

To perform the conversion, the analyzer engine identifies the metadata for the property in the source entity (604) and the target entity (605). The analyzer engine and compares the source metadata to the target metadata to determine whether a conversion is needed. When a conversion is needed, the conversion can be performed by identifying a formula from a lookup table and applying the formula to the data from the source entity (604) to generate the data for the target entity (605).

Referring to FIG. 6.3, the user interface (616) is updated to show a screen for editing the graph (606). The graph (606) includes the schemas (607, 609, 611, and 612) and the tranformations (608, 610, 613) that are used to identify and convert entities. The tranformations (608, 610, 613) include a single operation to directly convert source entities to target entities.

In one or more embodiments, the analyzer engine can generate additional transformations that include the operations from other transformations. For example, an additional transformation can be generated that includes the operations from the transformations (608, 610). With the transformations available to the analyzer engine, entities defined by the schemas (607, 609, and 612) can be converted to target entities defined by the schema (611).

The schema (607) is of the type "N:Borehole" and includes the properties "Name", "UWI", and "LatLong". The type "N:Borehole" represents a hole in the ground drilled for geological investigation, assessment or to bring hydrocarbons/natural gas to the surface. In one or more embodiments, the schema (607) also includes a "trajectory" property, which correlates to the path of the borehole with a series of (x, y, z) values that can be used to plot a line or curve in 3D space that represents the trajectory of the borehole. There can be several boreholes that belong to a specific well.

The schema (609) is of the type "A:Well", which includes the properties "Name", "UWI", "SpudDate", "Depth", "Location", and "Basin", which are described above in FIG. 6.1. The schema (609) generally defines entities for an oil well designed to bring petroleum to the surface via boreholes. Oil wells have globally unique identifiers that are tracked on various oilfield directories like the Norwegian Petroleum Directorate (NPD) and the American Petroleum Institute (API), which can be stored in the UWI property.

The schema (611) is of the type "I:Geo" and includes the property "Location". As used here, "Geo" is not a specific geoscientific term, but a software abstraction for any entity that has a 'Geographical Location'. The "I:Geo" type is used to map disparate types of source entities to a single type of entity ("I:Geo" target entities) to enable the comparison/sorting/grouping of the source data in the source entities. Most oilfield entities have a physical geographical location (e.g. the location of a well on the surface of the earth, the location of a specific rock formation, the location of a fluid pump, etc.) and by projecting these source types and entities as 'Geo' target entities, spatial operations can be performed across the different source entities.

The schema (612) is of the type "X:Company". The "X:Company" type includes the properties "Name", "Address", and "Website" that identify the name of the company, the address of the company, and a website for the company.

The transformation (608) can transform entities from the "N:Borehole" schema (607) to the "A:Well" schema (609). The map of the transformation (608) indicates that the "LatLong" property of an entity defined by the schema (607) is converted to the "Location" property of an entity defined by the schema (609). In one or more embodiments, the value for the "LatLong" property from a source "N:Borehole" entity is copied to the "Location" property of the target "A:Well" entity.

The transformation (610) can transform entities from the "A:Well" schema (609) to the "I:Geo" schema (611). The map of the transformation (610) indicates that the "Location" property of an entity defined by the schema (609) is converted to the "Location" property of an entity defined by the schema (611). In one or more embodiments, the value for the "Location" property from a source "A:Well" entity is copied to the "Location" property of the target "I:Geo" entity.

The transformation (613) can transform entities from the "X:Company" schema (612) to the "I:Geo" schema (611). The map of the transformation (613) indicates that a call to a web service is invoked to perform the transformation. For example, the "Address" property of a source "X:Company" entity is included in a call to the web service (615) that is routed through the network (614). The web service (615) respond with latitude and longitude coordinates that are put into the "Location" property of the target "I:Geo" entity.

Referring to FIG. 6.4, the user interface (616) is updated to show edits to the graph (606). The schemas are shown without properties and represented by a box with the type of the schema. The transformations are displayed without the maps and service calls and are represented as arrows between the schemas with a shortened numbering system. The shortened numbering system uniquely identifies each transformation displayed on user interface (616). In one or more embodiments, selecting a schema or transformation can bring up and edit window to edit the selected schema or transformation. In one or more embodiments, options were selected to present the schemas (607, 609, 611, 621, 623, 625, 627, 629, 632) and transformations (608, 610, 622, 624, 626, 628, 630, 631, 633) in a condensed view.

The graph (606) is updated in FIG. 6.4 to remove the schema (612) and to remove the transformation (613), the network (614) and the web service (615) shown in FIG. 6.3. The graph is updated to include the schemas (621, 623, 625, 627, 629, 632) and to include the transformations (622, 624, 626, 628, 630, 631, 633). The transformations (608, 610, 622, 624, 626, 628, 630, 631, 633) include a single operation to directly convert source entities to target entities.

With the changes to the available schemas and transformations, the analyzer engine can generate new additional transformations to incorporate the operations from the available transformations (608, 610, 622, 624, 626, 628, 630, 631, 633). With the updates to the graph (606), the "I:Geo" schema (611) can be reached from entities defined with the schemas (607, 609, 611, 621, 623, 625, 627, 629), but not with the schema (632).

The "N:ImageLog" schema (621) and the "T:SonicLog" schema (625) are used for entities that represent specific types of logs that measure more complex properties of the rock formations. Image logs usually measure a two dimensional (2D) set of values at a specific depth along a borehole. Sonic logs measure a formations capacity to transmit seismic waves.

The "X:Log" schema (623) is used for entities that represent collections of continuous data points that record details of the rock formation usually along the path of a borehole penetrating the earth. Logs commonly are a series of values (depending on what is being measured like porosity, temperature, permeability, etc.) indexed against the measured depth from the top of the borehole.

The "N:Horizon" schema (627) is used for entities that represent marker horizons. The marker horizons correspond to stratigraphic elements that share common properties (including age and composition) despite their presence in separate geographic locations.

The "I:3DPlane" schema (629) is for entities that represent a flat surface in three dimensional (3D) space.

The "N:Surface" schema (632) is for entities that represent a 3-dimensional plane comprising some geological formation. For example, "N: Surface" entities can represent various layers of the subsurface, including the sea bed.

Referring to FIG. 6.5, the client device (641) displays the user interface (642). In one or more embodiments, the user interface (642) is a command line interface (CLI) displayed in a shell or browser window on the client device (641). The user interface displays a query (643) and the results (644) that are presented in response to the query (643).

The user of the client device (641) entered the the query "geo:Location.Latitude>40". The query includes the class name of the schema as "geo", a property as "Location.Latitude", and a filter of "Location.Latitude>40". The analyzer engine determines that the target schema is "I:Geo" with the namespace "I" being determined from a previous query or a default value. The analyzer engine uses the graph to determine the source schemas that are reachable to the target schema and to determine the transformations needed to convert entities from the source schemas to the target schema. After retrieving target data from entities converted to target entities, the filter is applied to generate the results (644) that are presented in the user interface (642).

Embodiments may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (700) in FIG. 7.1 may be connected to or be a part of a network. For example, as shown in FIG. 7.2, the network (720) may include multiple nodes (e.g., node X (722), node Y (724)). Nodes may correspond to a computing system, such as the computing system shown in FIG. 7.1, or a group of nodes combined may correspond to the computing system shown in FIG. 7.1. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform at least a portion of one or more embodiments of the disclosure.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
determining, from a request, a target schema;
identifying a plurality of paths between a set of source schemas and the target schema, each path of the plurality of paths comprising a corresponding set of transformations between a source schema, of the set of source schemas, and the target schema, and each path of the plurality of paths having a corresponding cumulative weight based on the corresponding set of transformations;
receiving a set of source entities that correspond to the set of source schemas;
converting the set of source entities to a set of target entities by applying the corresponding set of transformations to the set of source entities based on the corresponding cumulative weight; and
presenting, in response to the request, a reply that comprises target data from the set of target entities.

2. The method of claim 1, further comprising:
identifying a target property from the request,
wherein the set of target entities generated from the set of source entities include the target property.

3. The method of claim 2,
wherein the set of source entities includes a source entity with source data of a source property with source metadata, and
wherein the set of target entities includes a target entity with target data of the target property with target metadata.

4. The method of claim 3, further comprising:
transforming the source data to the target data by:
using a map from a transformation from the corresponding set of transformations.

5. The method of claim 3, further comprising:
transforming the source data to the target data by:
invoking a web service with a web service request that includes the source data.

6. The method of claim 5, further comprising:
transforming the source data to the target data by:
receiving a web service response that includes the target data.

7. The method of claim 1,
wherein the request is a query that includes a filter.

8. The method of claim 7, further comprising:
filtering the set of target entities based on the filter prior to responding to the request.

9. The method of claim 7, further comprising:
filtering the target data based on the filter prior to responding to the request.

10. The method of claim 1,
wherein the source schema includes a source type that includes a source namespace, and
wherein least one of the source namespace and the source type are different from a target namespace and a target type of the target schema.

11. A system comprising:
a memory coupled to a processor;
a graph that includes a set of schemas and a set of transformations,
wherein the set of schemas includes a target schema and a set of source schemas;
an analyzer engine from figure that executes on the processor, uses the memory, and is configured for:
determining, from a request, the target schema;
identifying the a plurality of paths between the set of source schemas and the target schema from the graph, each path of the plurality of paths comprising a corresponding set of transformations between a source schema, of the set of source schemas, and the target schema, and each path of the plurality of paths having a corresponding cumulative weight based on the corresponding set of transformations;

receiving a set of source entities that correspond to the set of source schemas;

converting the set of source entities to a set of target entities by applying the corresponding set of transformations to the set of source entities based on the corresponding cumulative weight; and presenting, in response to the request, a reply that includes target data from the set of target entities.

12. The system of claim 11, wherein the analyzer engine is further configured for:

identifying a target property from the request, wherein the set of target entities generated from the set of source entities include the target property.

13. The system of claim 12, wherein the set of source entities includes a source entity with source data of a source property with source metadata, and wherein the set of target entities includes a target entity with target data of the target property with target metadata.

14. The system of claim 13, wherein the analyzer engine is further configured for:

transforming the source data to the target data by:
using a map from a transformation from the corresponding set of transformations.

15. The system of claim 13, wherein the analyzer engine is further configured for:

transforming the source data to the target data by:
invoking a web service with a web service request that includes the source data.

16. The system of claim 15, wherein the analyzer engine is further configured for:

transforming the source data to the target data by:
receiving a web service response that includes the target data.

17. The system of claim 8, wherein the analyzer engine is further configured for:

wherein the request is a query that includes a filter.

18. The system of claim 17, wherein the analyzer engine is further configured for:

filtering the set of target entities based on the filter prior to responding to the request.

19. The system of claim 17, wherein the analyzer engine is further configured for:

filtering the target data based on the filter prior to responding to the request.

20. A non-transitory computer readable medium comprising computer readable program code for:

determining, from a request, a target schema;

identifying a plurality of paths between a set of source schemas and the target schema, each path of the plurality of paths comprising a corresponding set of transformations between a source schema, of the set of source schemas, and the target schema, and each path of the plurality of paths having a corresponding cumulative weight based on the corresponding set of transformations;

receiving a set of source entities that correspond to the set of source schemas;

converting the set of source entities to a set of target entities by applying the corresponding set of transformations to the set of source entities based on the corresponding cumulative weight; and presenting, in response to the request, a reply that includes target data from the set of target entities.

* * * * *